United States Patent
Lejeune et al.

(10) Patent No.: US 9,444,640 B2
(45) Date of Patent: Sep. 13, 2016

(54) METHOD TO CREATE A COMPOSITE RUI FROM MULTIPLE RUIS

(75) Inventors: Stephane Lejeune, San Diego, CA (US); Graham Clift, El Cajon, CA (US)

(73) Assignee: SONY CORPORATION, Tokyo (JP)

( * ) Notice: Subject to any disclaimer, the term of this patent is extended or adjusted under 35 U.S.C. 154(b) by 754 days.

(21) Appl. No.: 13/073,761

(22) Filed: Mar. 28, 2011

(65) Prior Publication Data

US 2012/0254446 A1    Oct. 4, 2012

(51) Int. Cl.
*H04L 12/24*    (2006.01)
*H04L 12/28*    (2006.01)
*G06F 9/44*    (2006.01)
*G06F 3/0481*    (2013.01)

(52) U.S. Cl.
CPC ......... H04L 12/2814 (2013.01); G06F 9/4445 (2013.01); *G06F 3/0481* (2013.01)

(58) Field of Classification Search
CPC .................... H04L 12/1827; H04L 29/06027; H04N 7/1675
USPC ........................................................ 709/227
See application file for complete search history.

(56) References Cited

U.S. PATENT DOCUMENTS

| | | | |
|---|---|---|---|
| 7,043,357 B1 * | 5/2006 | Stankoulov et al. | 701/446 |
| 7,318,066 B2 * | 1/2008 | Kaufman et al. | |
| 7,532,628 B2 * | 5/2009 | Lepore et al. | 370/401 |
| 8,204,995 B2 * | 6/2012 | Sathish | 709/227 |
| 2004/0125756 A1 * | 7/2004 | Lepore et al. | 370/261 |
| 2005/0198686 A1 * | 9/2005 | Krause et al. | 725/118 |
| 2008/0163078 A1 * | 7/2008 | Van Der Sanden et al. | 715/762 |

* cited by examiner

*Primary Examiner* — Asghar Bilgrami
(74) *Attorney, Agent, or Firm* — Chip Law Group

(57) ABSTRACT

A compositing device lessens a rendering/processing load for rendering devices by processing one or more sessions instead of requiring the rendering devices to do so. The compositing device is able to receive one or more sessions from one or more source devices and process the sessions either together or separately. Then, either a composited session or a selected session is sent to be displayed by a rendering device.

25 Claims, 3 Drawing Sheets

METHOD TO CREATE A COMPOSITE RUI FROM MULTIPLE RUIS

FIELD OF THE INVENTION

The present invention relates to the field of remote user interfaces. More specifically, the present invention relates to generating and utilizing a composite RUI from multiple RUIs.

BACKGROUND OF THE INVENTION

The number of electronic devices in people's homes is continually increasing. Many years ago, homes only had a radio; then, a radio and a television. The number of devices has increased to the point where a typical home has several televisions, stereos, computers, video game consoles, mobile phones/devices, appliances and others. Furthermore, these devices are gaining intelligence so that they are able to communicate with each other.

The expansion of residential networks to include a multiplicity of devices that can share files asynchronously and connect to the Internet through residential gateways was facilitated by the de-facto standard use of wired and wireless ethernet connectivity. Asynchronous sharing then started to give way to buffered streaming of video as bandwidth availability improved. This was closely followed by real time streaming. Networks employ quality of service to manage bandwidth resource and Universal Plug and Play (UPnP) to perform discovery and compatibility of compressed video content. Video UPnP also defines remote user input operation like play, stop and rewind so that video control as well as video display is able to be performed remotely. Also, provisions were made to support graphical transfer of a remote user interface, but no implementations on the market have made use of this. UPnP allowed for many different standards of compressed video, but does not, however, certify that a client supported the relevant decoder. Digital Living Network Alliance (DLNA) is a standards body formed to provide certified device compatibility for a specific subset of UPnP implementations. It also defined the role of media servers, renderers, adapters, players and controllers.

A standard, referred to as Remote User Interface (RUI or Remote UI) is being developed to allow devices to operate each other and provide the user with a user interface that is configured appropriately for a device being used to control another device. For example, a user interface for a 46" wide television is not likely to appear properly on a mobile phone which has a display of 2". The Remote UI standard is a web-based protocol and framework for remote user interface on UPnP Networks and the Internet. The standard allows a UPnP-capable home network device to provide its interface (display and control options) as a web page to display on any other device coupled to the home network.

There are no well defined and widely accepted UPnP implementations for graphical RUI. One option, which has been backed by the UPnP Forum, is a browser based implementation known as CEA2014. The network client browser is considered to be heavy in flash, memory and/or processor requirements ('thick' client), whereas the network server application performs simple encapsulation of XML ('thin' server). In some situations this may be acceptable, like the case when rendering is performed by a personal computer and the application is run on a small mobile device, or a low end processing device, like a network router.

However, in the case of the home network where the rendering is done by a high definition TV, a Blu-Ray® player, a picture frame or a gaming machine, the use of a browser for RUI has some disadvantages. Firstly, a browser adds to the already substantial memory requirements of the renderers and so for these cost sensitive consumer electronics devices it may not be viable. Secondly, the processing speed requirements for a responsive experience are not going to be provided by the current range of devices available. And thirdly, the browser interface lends itself well to mouse and keyboard control, but is not necessarily the ideal format for a limited button remote control.

Also, the home network is able to include graphics applications built into game machines, video players, dongles and intelligent remotes on the low end, with cable boxes, cloud servers and multimedia PCs on the high end. To shoehorn all of these into one UPnP standard, it is clear that reach will be limited. In some cases substantial effort of rewriting or translation of the graphics application might be needed in order to fit the browser framework.

Another example of a proposed RUI is being provided through the RVU alliance. The RVU alliance was initiated by DirectTV in order to provide a pixel accurate remotely rendered version of their satellite decoder user interface. Unlike the browser based RUI, RVU uses a low level protocol that manipulates the graphics card framebuffer layers more directly. Instead of the script type messages that CEA2014 uses, RVU breaks up elements of the graphics into images that can be sent compressed or uncompressed over the network to be composited in the renderer's screen buffers or off screen buffers as needed. Simple bit commands are sent over the network to allow the images to be stretched, cut and alpha-blended on the renderer side. This type of RUI would be considered a thin network client and thick network server because most of the computation effort would be with the application. Also, because most actions involve sending image data, this type of RUI uses a lot of network resources.

The advantage of RVU is that the low level graphics operations are able to be supported by all graphics cards quite easily and is not directly dependent on the type of application to be able to function. However, sometimes performance is a key parameter in usability, and as such the network load and network server performance could severely limit how useful the protocol is. RVU is especially vulnerable where complete screen refreshes are needed often, like 3D rotations of a view. A browser approach could handle this more simply through scripts of simple rotation commands. Another similar limitation is when the application is providing remote graphics to multiple renderers, and causes the application processor to run short of the necessary MIPS to perform adequately.

SUMMARY OF THE INVENTION

A compositing device lessens a rendering/processing load for rendering devices by processing one or more sessions instead of requiring the rendering devices to do so. The compositing device is able to receive one or more sessions from one or more source devices and process the sessions either together or separately. Then, either a composited session or a selected session is sent to be displayed by a rendering device.

In one aspect, a method of generating a composite session comprises discovering a compositing device, generating one or more sessions between one or more source devices and the compositing device, processing the one or more sessions by the compositing device and sending a processed session to a rendering device for the rendering device to render the processed session. The method further comprises switching the processed session to a second rendering device. The one or more sessions are remote user interface sessions. The compositing device is discovered by the source device and the rendering device. Processing the sessions includes generating a composite session by processing the sessions into a single composite session. A user is able to select the single composite session. A single session of the sessions is selected by a user. A single session of the sessions is selected automatically based on network information and device information. The compositing device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPhone, an iPod®, a video player, a DVD writer/player, a television, a home entertainment system and an intelligent appliance.

In another aspect, a network of devices comprises a composite device for processing remote user interface data, one or more source devices for sending the remote user interface data to the composite device and one or more rendering devices for rendering the remote user interface data received from the composite device. The composite device, the one or more source devices and the one or more rendering devices are coupled through a network. A processed session is able to be switched between a plurality of the rendering devices. The remote user interface data is remote user interface sessions. The compositing device is discovered by the one or more source devices and the one or more rendering devices. Processing the remote user interface data includes generating a composite session by processing remote user interface sessions into a single composite session. A user is able to select the single composite session. A single session of the remote user interface data is selected automatically based on network information and device information.

In another aspect, a system programmed in a controller in a device comprises a session module for communicating one or more sessions with one or more source devices, a processing module for processing the one or more sessions and a sending module for sending a processed session to a rendering device for the rendering device to render the processed session. The session is a remote user interface session. Processing the sessions includes generating a composite session by processing the sessions into a single composite session. A user is able to select the single composite session. A single session of the sessions is selected by a user. A single session of the sessions is selected automatically based on network information and device information.

In yet another aspect, a compositing device comprises a memory for storing an application, the application for communicating one or more remote user interface sessions with one or more source devices, processing the one or more remote user interface sessions and sending a processed remote user interface session to a rendering device for the rendering device to render the processed remote user interface session and a processing component coupled to the memory, the processing component for processing the application. The compositing device is discovered by the one or more source devices and the rendering device. Processing the remote user interface sessions includes generating a composite session by processing the sessions into a single composite session. A user is able to select the single composite session. A single session of the remote user interface sessions is selected by a user. A single session of the remote user interface sessions is selected automatically based on network information and device information.

DETAILED DESCRIPTION OF THE PREFERRED EMBODIMENT

Processing multiple incoming Remote User Interface (RUI) sessions and composing them into a single user interface requires extensive resources and cannot be embedded into all RUI rendering devices; therefore, an addition device is able to be utilized to perform such tasks.

A method and system to generate a composite RUI from multiple RUIs (or services) to enable a means of selection to the user by taking individual available "pages" and displaying them in such a way to give the user a choice and a seemingly direct coupling to the source are described herein. The method and system also present multiple RUIs for the user to choose from by discovering available RUIs and/or other inputs, compositing all of these RUIs together and exporting the composited RUI to another device through which the user is able to choose.

To provide compatibility with Digital Living Network Alliance (DLNA), a new class of services is defined in DLNA: an RUI source, an RUI renderer and an RUI compositing device. The RUI compositing device composes RUIs into a single user interface and serves the resulting user interface to a rendering device.

The RUI renderer detects through DLNA the presence of multiple RUI sources. The RUI renderer also detects through DLNA the presence of an RUI compositing device. The RUI renderer establishes a session to the RUI compositing device. The RUI compositing device subsequently establishes a session to the multiple RUI sources and composes a single user interface from the multiple RUI sessions. The RUI compositing device serves the resulting user interface to the RUI renderer through the established session. When the RUI compositing device detects that it is not adding value any more (e.g. the user interface it generates is composed of a single RUI), the RUI compositing device will instruct the RUI renderer to start a direct RUI session with its associated RUI source and request the RUI source to transition its RUI session to the newly established session with the RUI renderer.

Figure 1:
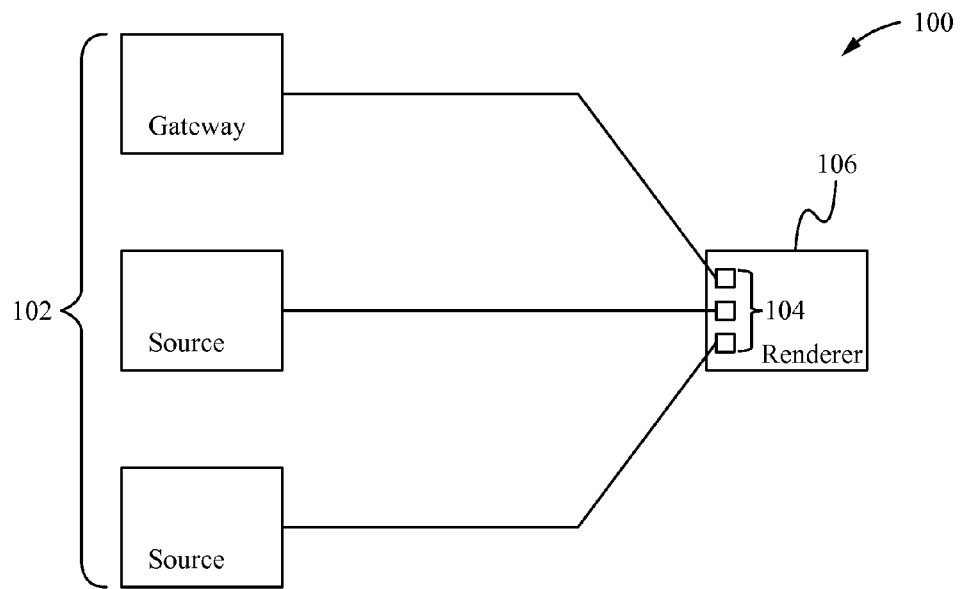
FIG. 1 illustrates a block diagram of a network of devices without implementing a method of generating a composite RUI.

FIG. 1 illustrates a block diagram of a network of devices 100 without implementing a method of generating a composite RUI. The network of devices 100 includes one or more gateway or source devices 102 coupled to a renderer (e.g. a television) 106. In some embodiments, the source devices 102 and the renderer 106 are coupled directly, and in some embodiments, the source devices 102 and the renderer 106 are coupled through a network. The source devices 102 each establish separate session 104 with the renderer 106. The load of processing and the memory use of the sessions 104 (e.g. three sessions) by the renderer 106 is able to slow down the renderer 106 causing an unenjoyable experience for the user.

Figure 2:
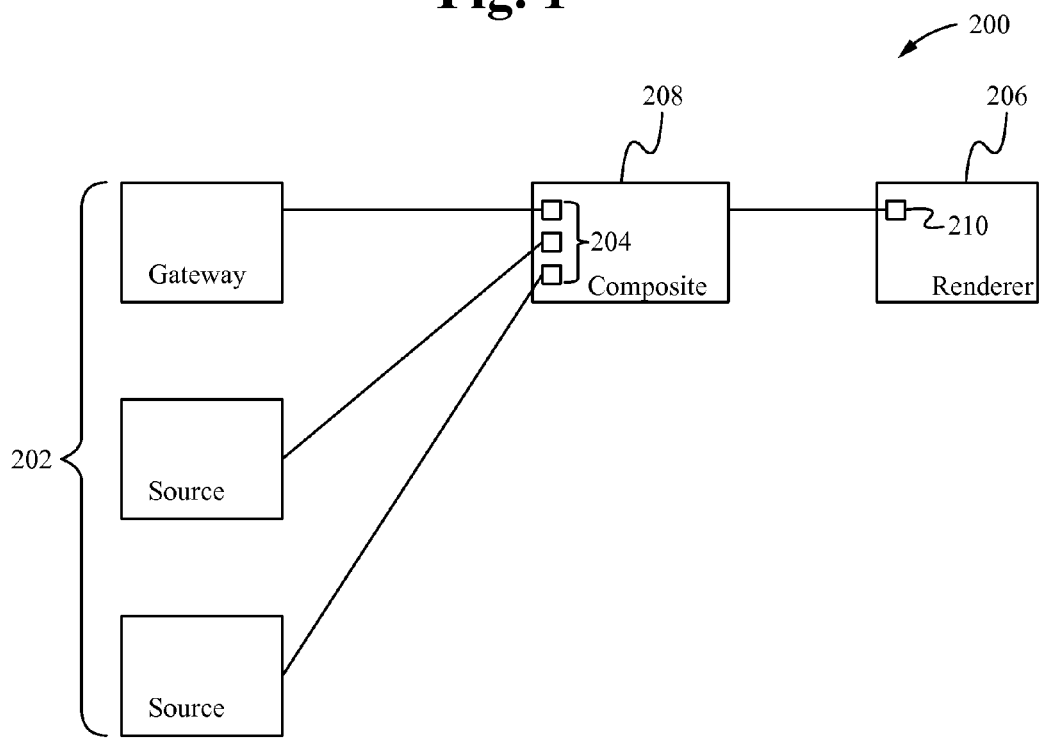
FIG. 2 illustrates a block diagram of a network of devices implementing a method of generating a composite RUI according to some embodiments.

FIG. 2 illustrates a block diagram of a network of devices implementing a method of generating a composite RUI according to some embodiments. The network of devices 200 includes one or more gateway or source devices 202 coupled to a compositing device 208 which is coupled to a renderer (e.g. a television) 206. In some embodiments, the source devices 202, the compositing device 208 and the renderer 206 are coupled directly, and in some embodiments, the source devices 202, the compositing device 208 and the renderer 206 are coupled through a network. The source devices 202 each establish a separate session 204 with the compositing device 208. The compositing device 208 processes each of the sessions 204. The compositing device 208 is then able to provide a single session 210 to the renderer 206. In some embodiments, the single session 210 is the sessions 204 combined into one session 210. In some embodiments, the renderer 206 automatically selects one session 210 of the sessions 204 and renders only that one session 210. In some embodiments, the renderer 206 enables a user to select one session 210 from the sessions 204 processed by the compositing device 208.

Figure 3:
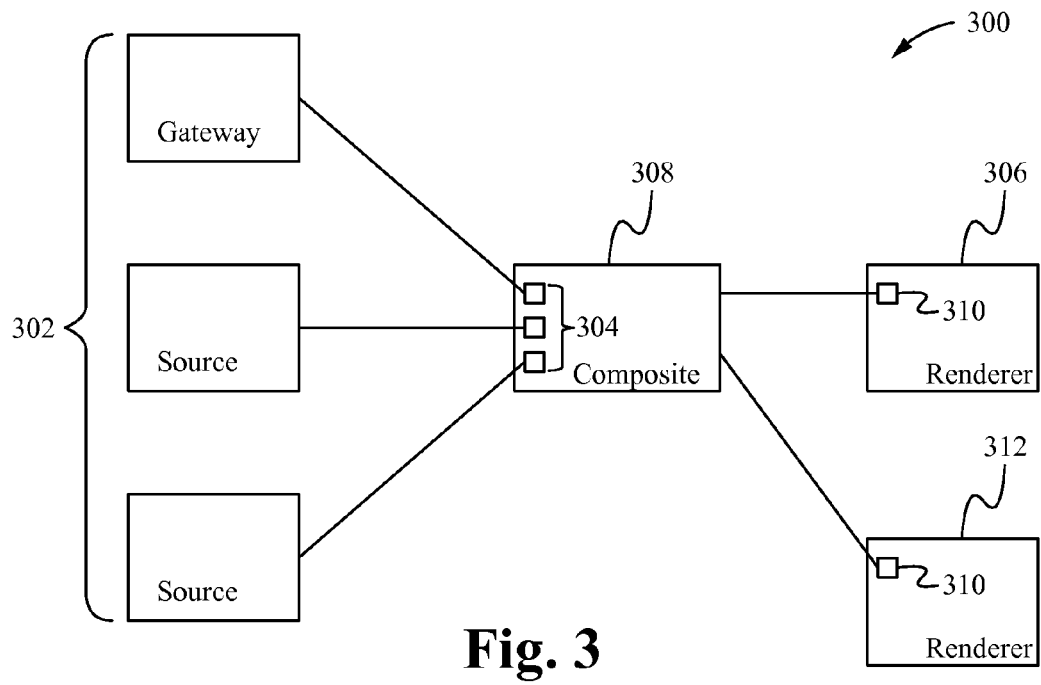
FIG. 3 illustrates a block diagram of a network of devices implementing a method of generating a composite RUI according to some embodiments.

FIG. 3 illustrates a block diagram of a network of devices implementing a method of generating a composite RUI according to some embodiments. The network of devices 300 includes one or more gateway or source devices 302 coupled to a compositing device 308 which is coupled to a first renderer (e.g. a television) 306 and a second renderer (e.g. a mobile device) 312. In some embodiments, the source devices 302, the compositing device 308, the first renderer 306 and the second renderer 308 are coupled directly, and in some embodiments, the source devices 302, the compositing device 308, the first renderer 306 and the second renderer 312 are coupled through a network. The network is able to be any type of network including, but not limited to, a LAN, a WAN, the Internet, a cellular network, a wireless network, a wired network and/or any combination thereof. The source devices 302 each establish a separate session 304 with the compositing device 308. The compositing device 308 processes each of the sessions 304. The compositing device 308 is able to send a session 310 to the first renderer 306 and/or the second renderer 312. For example, if a user is watching a video on a television and then wants the video transferred to his mobile device, the compositing device 308 is able to make the transfer seamlessly. Although only two renderer devices are described above, any number of renderer devices are able to be utilized. Further, although source devices are described, a single source device is able to be included as well.

Figure 4:
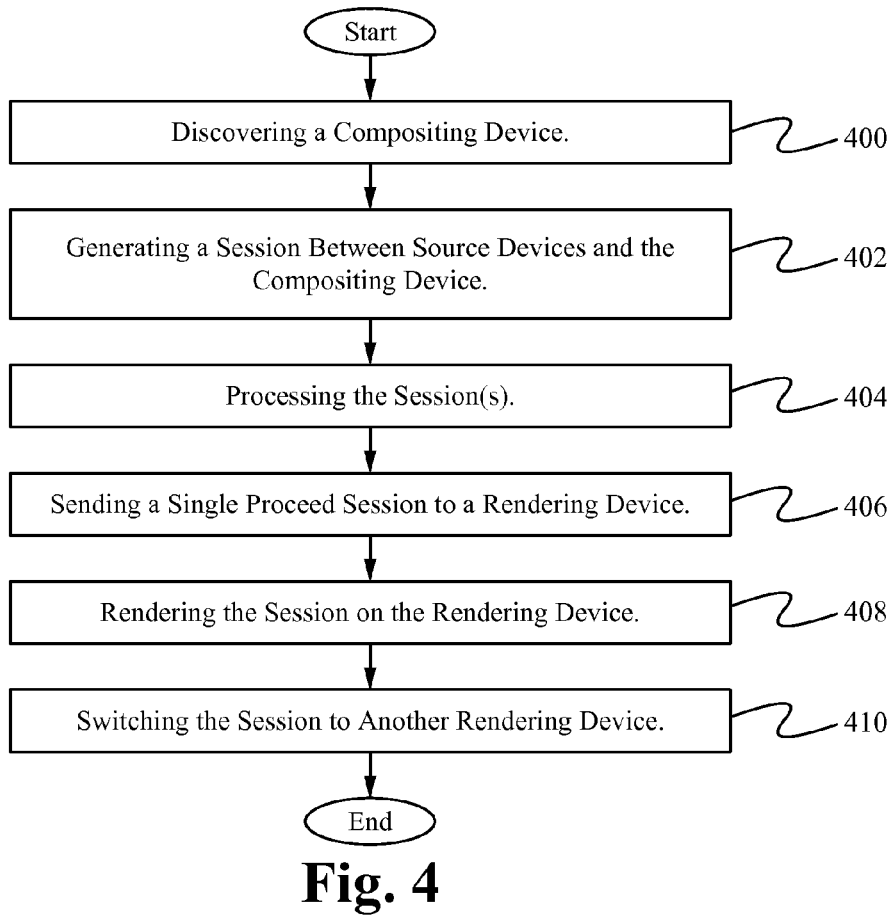
FIG. 4 illustrates a flowchart of a method of utilizing a compositing device according to some embodiments.

FIG. 4 illustrates a flowchart of a method of utilizing a compositing device according to some embodiments. In the step 400, a compositing device is discovered. The discovery of the compositing device is by any of the devices such as the source devices and the renderers. In the step 402, one or more of the source devices generate a session with the compositing device. In the step 404, the compositing device processes the session(s). Processing the sessions is able to include processing them individually or generating a composite session by processing them together. In the step 406, the compositing device sends a single session to a renderer. The single session is able to be selected by a user or automatically sent based on network information, device information or any other basis. In the step 408, the renderer renders the session (e.g. displays a video on a television). In some embodiments, rendering includes simply displaying a video on a device, and in some embodiments, rendering includes further processing of a video and then displaying the video. In the step 410, if it is requested that the session be switched to another device, the composite device sends the session to another device. Although specific steps are described, in some embodiments, fewer or more steps are included, and/or the order of the steps is able to be changed.

In some embodiments, the compositing is performed based on network limitations and device limitations. For example, if it is detected that the network has significant traffic, the compositing device is able to be utilized to provide additional memory and/or processing power. However, if it is detected that the network does not have much traffic and the renderer has sufficient ability to process a session, the compositing device is not used (e.g. it is placed in a standby state).

Figure 5:
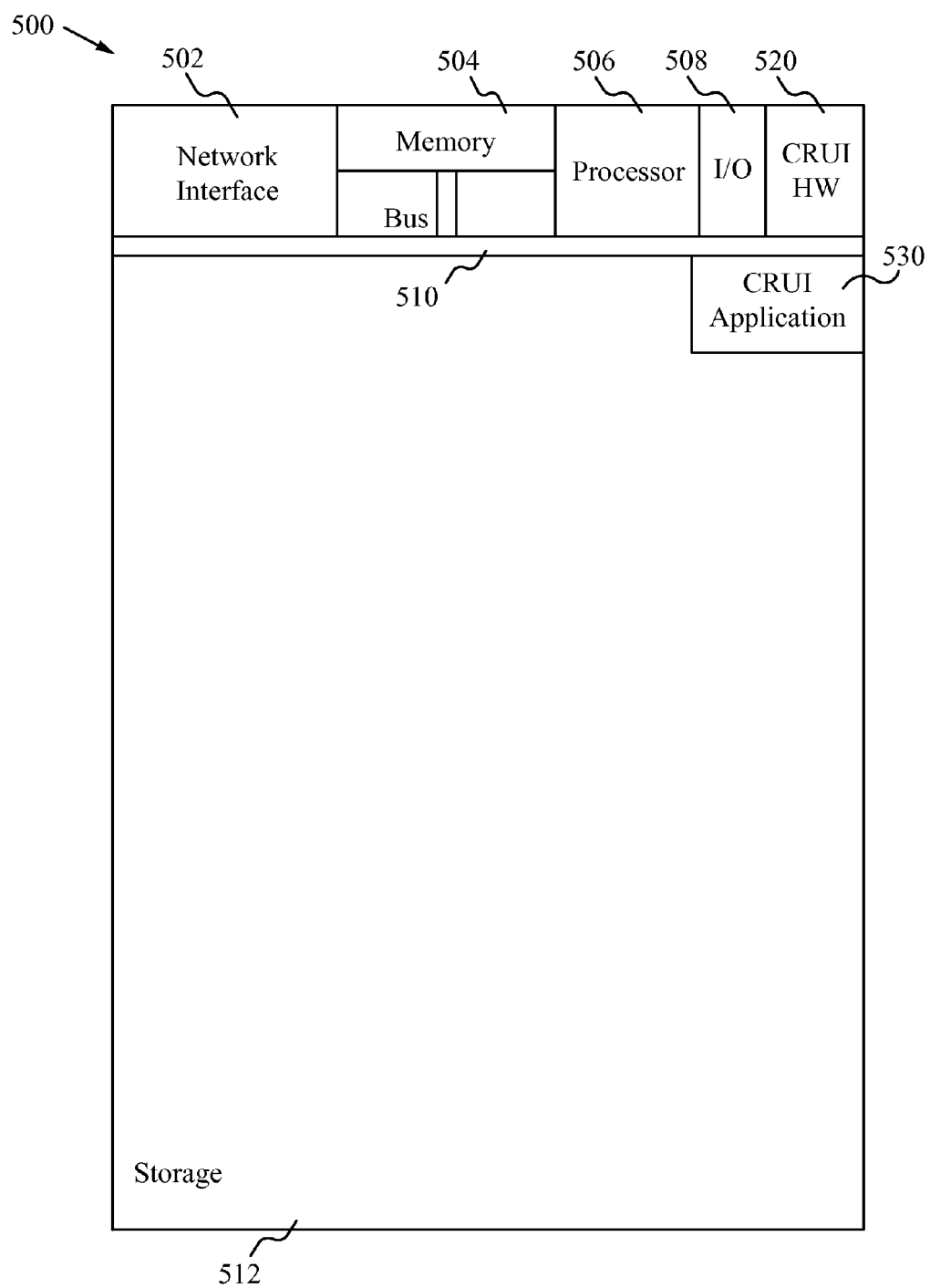
FIG. 5 illustrates a block diagram of an exemplary computing device to generate a composite RUI according to some embodiments.

FIG. 5 illustrates a block diagram of an exemplary computing device 500 to generate a composite RUI according to some embodiments. The computing device 500 is able to be used to acquire, store, compute, communicate and/or display information. For example, the computing device 500 is able to receive, generate, store, and process RUI sessions. The computing device 500 is also able to provide additional processing power and memory to assist in other devices' processing. In general, a hardware structure suitable for implementing the computing device 500 includes a network interface 502, a memory 504, a processor 506, I/O device(s) 508, a bus 510 and a storage device 512. The choice of processor is not critical as long as a suitable processor with sufficient speed is chosen. The memory 504 is able to be any conventional computer memory known in the art. The storage device 512 is able to include a hard drive, CDROM, CDRW, DVD, DVDRW, Blu-ray®, flash memory card or any other storage device. The computing device 500 is able to include one or more network interfaces 502. An example of a network interface includes a network card connected to an Ethernet or other type of LAN. The I/O device(s) 508 are able to include one or more of the following: keyboard, mouse, monitor, display, printer, modem, touchscreen, button interface and other devices. Compositing application(s) 530 used to perform the composite RUI generation method are likely to be stored in the storage device 512 and memory 504 and processed as applications are typically processed. More or less components shown in FIG. 5 are able to be included in the computing device 500. In some embodiments, composite RUI generation method hardware 520 is included. Although the computing device 500 in FIG. 5 includes applications 530 and hardware 520, the composite RUI generation method is able to be implemented on a computing device in hardware, firmware, software or any combination thereof. For example, in some embodiments, the composite RUI generation method applications 530 are programmed in a memory and executed using a processor. In another example, in some embodiments, the composite RUI generation method hardware 520 is programmed in hardware logic including gates specifically designed to implement the composite RUI generation method.

In some embodiments, the composite RUI generation method application(s) 530 include several applications and/or modules. As described herein, the modules are able to include a session module for communicating, such as generating and/or receiving, one or more sessions from the one or more source devices, a processing module for processing the one or more sessions and a sending module for sending a processed session to a rendering device for the rendering device to render the processed session. In some embodiments, the session module does not generate the session but rather the session is generated by the source device. In some embodiments, modules include one or more sub-modules as well. In some embodiments, fewer or additional modules are able to be included.

Examples of suitable computing devices for the composite device, source device and rendering device include a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®/iPhone, a video player, a DVD writer/player, a Blu-ray® writer/player, a television, a home entertainment system or any other suitable computing device. In some embodiments, a computing device is able to include intelligent appliances such as a refrigerator, a toaster, a toaster oven and a microwave, where the appliances are able to process and/or present information.

To utilize the compositing device, a user incorporates the compositing device in a network by coupling the compositing device to devices such as source devices and rendering devices in the network. When source devices attempt to establish a session with a rendering device, the sessions are established with the compositing device which is able to process the sessions. The processing is able to occur automatically, and then the session is able to be passed on automatically or manually depending on the implementation. For example, the user is able to manually select which session is sent to the rendering device. From a user's perspective, the user generally does not notice that the compositing device is functioning aside from the rendering devices functioning more efficiently with the processor load being shared with the compositing device.

In operation, the compositing device processes sessions from source devices and then sends a single session to rendering device(s). The sessions are able to be processed together into a single composite session or separately to allow a user to select which session to send to the rendering device. The compositing device provides added processing power and memory so that rendering devices are not overloaded with too much data to process which would cause them to slow down.

The devices implemented within the network described herein are able to implement Digital Living Network Alliance (DLNA) standard as well.

A Method to Create a Composite RUI from Multiple RUIs

1. A method of generating a composite session comprising:
    a. discovering a compositing device;
    b. generating one or more sessions between one or more source devices and the compositing device;
    c. processing the one or more sessions by the compositing device; and
    d. sending a processed session to a rendering device for the rendering device to render the processed session.
2. The method of clause 1 further comprising switching the processed session to a second rendering device.
3. The method of clause 1 wherein the one or more sessions are remote user interface sessions.
4. The method of clause 1 wherein the compositing device is discovered by the source device and the rendering device.
5. The method of clause 1 wherein processing the sessions includes generating a composite session by processing the sessions into a single composite session.
6. The method of clause 5 wherein a user is able to select the single composite session.
7. The method of clause 1 wherein a single session of the sessions is selected by a user.
8. The method of clause 1 wherein a single session of the sessions is selected automatically based on network information and device information.
9. The method of clause 1 wherein the compositing device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPhone, an iPod®, a video player, a DVD writer/player, a television, a home entertainment system and an intelligent appliance.
10. A network of devices comprising:
    a. a composite device for processing remote user interface data;
    b. one or more source devices for sending the remote user interface data to the composite device; and
    c. one or more rendering devices for rendering the remote user interface data received from the composite device.
11. The network of devices of clause 10 wherein the composite device, the one or more source devices and the one or more rendering devices are coupled through a network.
12. The network of devices of clause 10 wherein a processed session is able to be switched between a plurality of the rendering devices.
13. The network of devices of clause 10 wherein the remote user interface data is remote user interface sessions.
14. The network of devices of clause 10 wherein the compositing device is discovered by the one or more source devices and the one or more rendering devices.
15. The network of devices of clause 10 wherein processing the remote user interface data includes generating a composite session by processing remote user interface sessions into a single composite session.
16. The network of devices of clause 15 wherein a user is able to select the single composite session.
17. The network of devices of clause 10 wherein a single session of the remote user interface data is selected automatically based on network information and device information.
18. A system programmed in a controller in a device comprising:
    a. a session module for communicating one or more sessions with one or more source devices;
    b. a processing module for processing the one or more sessions; and
    c. a sending module for sending a processed session to a rendering device for the rendering device to render the processed session.
19. The system of clause 18 wherein the session is a remote user interface session.
20. The system of clause 18 wherein processing the sessions includes generating a composite session by processing the sessions into a single composite session.
21. The system of clause 20 wherein a user is able to select the single composite session.
22. The system of clause 18 wherein a single session of the sessions is selected by a user.

23. The system of clause 18 wherein a single session of the sessions is selected automatically based on network information and device information.

24. A compositing device comprising:
   a. a memory for storing an application, the application for:
      i. communicating one or more remote user interface sessions with one or more source devices;
      ii. processing the one or more remote user interface sessions; and
      iii. sending a processed remote user interface session to a rendering device for the rendering device to render the processed remote user interface session; and
   b. a processing component coupled to the memory, the processing component for processing the application.

25. The compositing device of clause 24 wherein the compositing device is discovered by the one or more source devices and the rendering device.

26. The compositing device of clause 24 wherein processing the remote user interface sessions includes generating a composite session by processing the sessions into a single composite session.

27. The compositing device of clause 26 wherein a user is able to select the single composite session.

28. The compositing device of clause 24 wherein a single session of the remote user interface sessions is selected by a user.

29. The compositing device of clause 24 wherein a single session of the remote user interface sessions is selected automatically based on network information and device information.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A method of generating a composite session comprising:
   discovering a compositing device;
   generating one or more sessions between one or more source devices and the compositing device, wherein the one or more sessions comprise remote user interface data;
   processing the one or more sessions by the compositing device; and
   sending a processed session to a rendering device for the rendering device to render the processed session, wherein the compositing device is discovered by the one or more source devices and the rendering device, and
   wherein when the compositing device detects that the remote user interface data comprises a single remote user interface, the compositing device instructs the rendering device to begin a direct session with an associated source device of the one or more source devices.

2. The method of claim 1 further comprising switching the processed session to a second rendering device.

3. The method of claim 1 wherein the one or more sessions are remote user interface sessions.

4. The method of claim 1, wherein processing the one or more sessions includes generating the composite session by processing the one or more sessions into a single composite session.

5. The method of claim 4 wherein a user is able to select the single composite session.

6. The method of claim 1, wherein a single session of the one or more sessions is selected by a user.

7. The method of claim 1, wherein a single session of the one or more sessions is selected automatically based on network information and device information.

8. The method of claim 1, wherein the compositing device is selected from a group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPhone, an iPod®, a video player, a DVD writer/player, a television, a home entertainment system and an intelligent appliance.

9. A network of devices comprising:
   a composite device for processing remote user interface data;
   one or more source devices for sending the remote user interface data to the composite device; and
   one or more rendering devices for rendering the remote user interface data received from the composite device, wherein processing the remote user interface data includes generating a composite session by processing remote user interface sessions into a single composite session, and
   wherein when the composite device detects that the remote user interface data comprises a single remote user interface, the composite device instructs the one or more rendering devices to begin a direct remote user interface session with their associated one or more source devices and requests the one or more source devices to transition a remote user interface session to a newly established remote user interface session that directly connects the one or more rendering devices with their associated one or more source devices.

10. The network of devices of claim 9 wherein the composite device, the one or more source devices and the one or more rendering devices are coupled through a network.

11. The network of devices of claim 9, wherein a processed session is able to be switched between the one or more rendering devices.

12. The network of devices of claim 9, wherein the remote user interface data is the remote user interface sessions.

13. The network of devices of claim 9, wherein the composite device is discovered by the one or more source devices and the one or more rendering devices.

14. The network of devices of claim 9 wherein a user is able to select the single composite session.

15. The network of devices of claim 9 wherein a single session of the remote user interface data is selected automatically based on network information and device information.

16. A system programmed in a controller in a device comprising:
   a session module configured for communicating a plurality of sessions with one or more source devices, wherein each of the plurality of sessions comprise remote user interface data;
   a processing module configured for processing the plurality of sessions; and a sending module configured for sending processed sessions to a rendering device for the rendering device to render the processed sessions, wherein processing the plurality of sessions includes generating a composite session by processing the plurality of sessions into a single composite session, and wherein when the device detects that the remote user interface data comprises a single remote user interface, the device instructs the rendering device to begin a direct session with an associated source device of the one or more source devices.

17. The system of claim 16 wherein each of the plurality of sessions is a remote user interface session.

18. The system of claim 16 wherein a user is able to select the single composite session.

19. The system of claim 16, wherein a single session of the plurality of sessions is selected by a user.

20. The system of claim 16, wherein a single session of the plurality of sessions is selected automatically based on network information and device information.

21. A compositing device comprising:
a memory for storing an application, the application for:
communicating one or more remote user interface sessions with one or more source devices, wherein the one or more remote user interface sessions comprise remote user interface data;
processing the one or more remote user interface sessions; and
sending a processed remote user interface session to a rendering device for the rendering device to render the processed remote user interface session, wherein when the compositing device detects that the remote user interface data comprises a single remote user interface, the compositing device instructs the rendering device to begin a direct remote user interface session with an associated source device of the one or more source devices; and a processing component coupled to the memory, the processing component for processing the application.

22. The compositing device of claim 21 wherein the compositing device is discovered by the one or more source devices and the rendering device.

23. The compositing device of claim 21, wherein processing the one or more remote user interface sessions includes generating a composite session by processing the sessions into a single composite session.

24. The compositing device of claim 23 wherein a user is able to select the single composite session.

25. The compositing device of claim 21, wherein a single session of the one or more remote user interface sessions is selected by a user.

* * * * *